United States Patent [19]

Strosser et al.

[11] Patent Number: 5,444,966
[45] Date of Patent: Aug. 29, 1995

[54] METAL DETECTION APPARATUS FOR AGRICULTURAL HARVESTER

[75] Inventors: Richard P. Strosser, Akron; Marvin G. Weaver, Jr., Lititz; Mark K. Chow, Paoli, all of Pa.

[73] Assignee: New Holland North America, Inc., New Holland, Pa.

[21] Appl. No.: 191,181

[22] Filed: Feb. 3, 1994

[51] Int. Cl.6 .................. A01D 75/18; A01F 12/16
[52] U.S. Cl. .................. 56/10.2 J; 324/235; 324/243; 324/262; 460/2
[58] Field of Search .......... 56/10.2 J, DIG. 15; 460/2, 3; 324/207.2, 239, 243, 235, 251, 262

[56] References Cited

U.S. PATENT DOCUMENTS

| | | |
|---|---|---|
| 3,757,501 | 9/1973 | Benett, Jr. et al. ............... 460/2 |
| 3,889,249 | 6/1975 | Bennett, Jr. et al. ............. 340/568 |
| 3,972,156 | 8/1976 | Bennett, Jr. et al. ............. 460/3 |
| 4,066,962 | 1/1978 | Jaffe .............................. 324/235 X |
| 4,290,255 | 9/1981 | Martenas ........................ 460/2 |
| 4,344,074 | 8/1982 | Strosser et al. ................. 340/684 |
| 4,433,528 | 2/1984 | Bohman ......................... 56/10.2 J |
| 4,788,813 | 12/1988 | Strosser et al. ............... 56/10.2 J |
| 5,070,682 | 12/1991 | Bohman ......................... 56/10.2 J |
| 5,078,645 | 1/1992 | Bohman et al. ................. 460/2 |
| 5,092,818 | 3/1992 | Bohman et al. ................. 460/2 |

OTHER PUBLICATIONS

*Radio Electronics* "Hall Effect in Solid" Jul. 1968, pp. 42–45, 93.

Allegro Microsystems Inc., pp. 4–41 through 4–48 and 4–98 through 4–102 (catalog-no date).

*Primary Examiner*—David J. Bagnell
*Attorney, Agent, or Firm*—Griffin, Butler, Whisenhunt & Kurtossy

[57] ABSTRACT

An agricultural harvesting machine having feed rolls for feeding crop material along a feed path to a cutterhead which chops the crop material is provided with a metal detector for detecting ferrous metal objects passing along the feed path. The metal detector comprises a plurality of magnets and a plurality of generally planar Hall effect sensing elements. The magnets collectively produce a detection field which extends into the crop feed path. Each sensing element is disposed such that the magnetic field produced by two adjacent magnets is normal to the plane of the sensing element. In addition the sensing elements are disposed in a plurality of planes all normal to the crop feed path. However, the sensing elements are disposed in planes oriented at different angles relative to the direction of crop feed. When a ferrous metal object passes through the detection field it varies the density of the magnetic field at one or more of the transducers and the Hall effect causes an output voltage signal to be developed across the output leads. The output signal is applied through processing circuitry to a stop apparatus to stop the feed rolls. The transducers are mounted on a circuit board and the circuit board surmounts the magnets inside a housing within one of the feed rolls. An encapsulating material fills the interior of the housing.

12 Claims, 3 Drawing Sheets

METAL DETECTION APPARATUS FOR AGRICULTURAL HARVESTER

FIELD OF THE INVENTION

The present invention relates to metal detectors and more particularly to metal detectors for detecting ferrous material in crop harvesting machines.

BACKGROUND OF THE INVENTION

A typical harvesting machine, such as a forage harvester, may include an attachment mounted on the front end of the harvester for cutting and/or gathering crop material and feeding it into a basic processing unit. The basic unit includes feed rolls for advancing the crop material, compressing it into a mat, and feeding it into a cutterhead. The cutterhead, which generally comprises a plurality of knives mounted on a rotating reel, the knives cooperating with a stationary shear bar to chop the crop material. The crop material is then discharged from the harvester.

Tramp metal such as fencing stakes, nuts and bolts detached from other equipment, tools which have been left in the field or bounced out of moving machines, etc. is frequently picked up from the field with the crop material. The tramp metal, if it reaches the cutterhead, damages the shear bar and cutterhead knives. The problem of tramp metal in crop material being processed by agricultural harvesting equipment moving across farm fields is well known and much time and money has been expended in efforts to solve the problem.

One conventional way to alleviate the problems caused by tramp metal has been to provide a magnetic metal detector within one of the feed rolls which feeds the crop material toward the cutterhead. Metal passing in proximity to the feed roll varies a magnetic field generated by the detector and circuits are provided for detecting variations in the magnetic field and stopping the feeder mechanism when a variation is detected, thereby preventing metal objects from being fed into the cutterhead.

Many types of magnetic metal detectors have been devised in efforts to obtain a detector which is inexpensive and easily manufactured, at the same time being small enough to be located within a feed roll and sensitive enough to detect smaller metal objects such as nails, nuts and bolts anywhere over the lateral extent of the crop feed path. Various forms of prior art metal detectors are disclosed in Bennett, Jr. et al. Pat. Nos. 3,972,156, 3,757,501 and 3,889,249, Martenas Pat. No. 4,290,255, Bohman Pat. Nos. 4,433,528 and 5,070,682, Bohman et al. Pat. Nos. 5,078,645, and 5,092,818 and Strosser et al. Pat. Nos. 4,344,074 and 4,788,813. These detectors typically include a plurality of electromagnets or permanent magnets for producing a magnetic detection field and sensing coils for sensing changes in the magnetic field produced by metal objects passing through the crop feed path. Each coil may comprise a thousand turns of insulated wire. The coils are bulky and only limited space is available within the feed roll to accommodate them. Furthermore, to prevent wear of the coil insulation due to rubbing as a result of harvester vibrations, insulating pads are required between the coils and the magnets and the coils and the housing enclosing the detector.

SUMMARY OF THE INVENTION

An object of the present invention is to provide a magnetic metal detector for a harvesting machine, the metal detector requiring less space than prior art detectors.

Another object of the present invention is to provide a magnetic metal detector which is easily accommodated within a feed roll of a harvester.

A further object of the invention is to provide a magnetic metal detector which does not require plural turn sensing coils.

Yet another object of the invention is to provide a magnetic metal detector apparatus for detecting passage of metal objects through the feed path of an agricultural harvesting machine, the detector apparatus comprising a plurality of magnets for producing magnetic fields, a plurality of conductive transducer elements disposed within the magnetic fields, means for applying currents to the transducer elements, and output means including signal processing circuits responsive to the transducer elements, the output means being connected to a means for stopping the feed apparatus of the harvesting machine.

Still another object of the invention is to provide a metal detector apparatus as described above wherein the transducer elements are mounted on a circuit board surmounting the magnets, the transducer elements, circuit board and magnets being encapsulated in a housing located within a rotatable feed roll of the harvesting machine.

Another object of the invention is to provide a metal detector disposed adjacent the crop feed path of a forage harvester, the metal detector comprising a plurality of permanent magnets surmounted by a circuit board on which a plurality of Hall effect transducers are mounted, the circuit board facing the crop feed path so that the transducers lie in planes generally normal to the crop feed path.

Other objects of the invention and the manner of making and using it will become obvious upon consideration of the following description and the accompanying drawings.

DETAILED DESCRIPTION OF THE INVENTION

Figure 1:
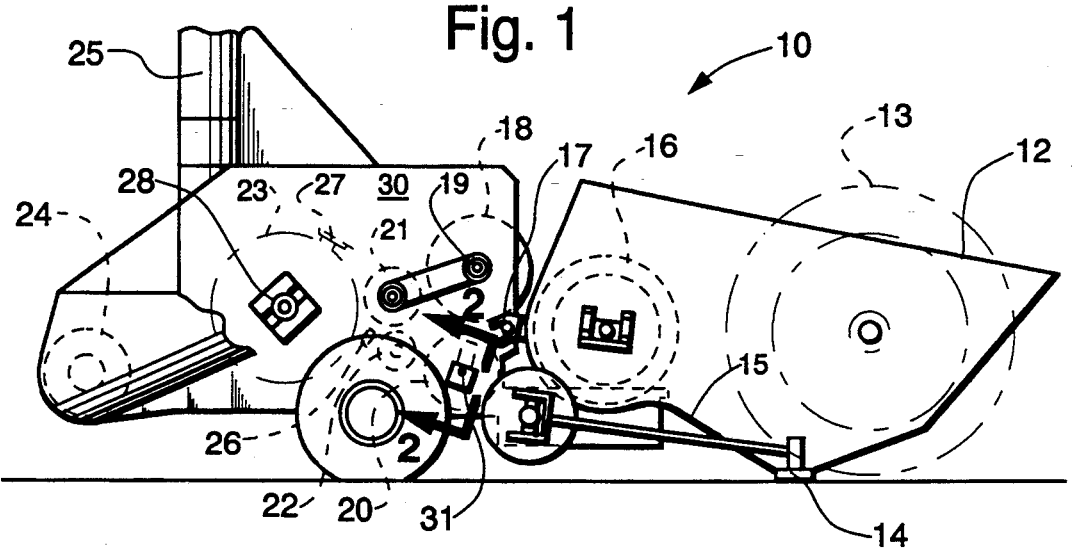
FIG. 1 is a schematic view of a forage harvester in which the invention may be used.

FIG. 1 illustrates an improved forage harvesting machine of the kind in which the present invention may be employed. It is apparent that the invention may also be employed with benefit for the protection of other types of farm machinery. The representative farm machine illustrated in FIG. 1 may be similar to the forage harvester in Garrott U.S. Pat. Nos. 3,523,411 and 3,959,953.

The forage harvester, generally designated by reference numeral 10, comprises a base unit 11 and an attachment 12 for gathering crop material and feeding it to the base unit for processing. Attachment 12 directly cuts crop material in the field and feeds it to base unit 11 where it is chopped and eventually conveyed to a trailing forage wagon (not shown). A direct cut attachment is shown for exemplary purposes but in actual practice any type of attachment, e.g., a row crop unit or a windrow pickup, could be used with a base unit of the type shown insofar as the present invention is concerned.

More particularly, the attachment shown includes a reel 13, depicted in phantom outline, which operates in a conventional manner to guide material over a cutter bar 14 and up an inclined floor 15 to a consolidating auger 16, also depicted in phantom outline. Attachment 12 is pivotally mounted to base unit 11 at 17 and is adapted to feed crop material to the space between upper and lower front feed rolls 18, 20 and then on to upper and lower rear feed rolls 21, 22 which in turn feed material to a cutterhead 23 (shown in phantom) which chops the crop material and guides it rearwardly to conveyor means 24 in a well known manner. The conveyor 24 commonly comprises an auger mounted transversely for feeding the chopped crop material to a blower unit which conveys it upwardly via a vertical spout 25 (partially shown) and then rearwardly to a trailing forage wagon.

The front and rear pairs of upper and lower feed rolls compress into a mat-like configuration the crop material which has been gathered by the attachment and consolidated by auger 16. The mat of material is fed rearwardly across the top surface of a shearbar 26 which is operatively associated with a series of cutting elements 27 (one of which is shown in phantom) on rotating cutterhead 23 journaled for rotation by mounting assembly 28 in sidewall 30 of base unit 11.

The present invention is directed to apparatus for detecting ferrous metal objects in the crop material being fed to cutterhead 23, and more particularly, it is concerned with detection means mounted in the lower front feed roll 20 for detecting metal objects in the compressed mat and initiating a control signal in response thereto for discontinuing transport of the crop material prior to introduction of the sensed object into the area at which the shearbar 26 and cutterhead 23 cooperatively engage and cut the crop.

Figure 2:
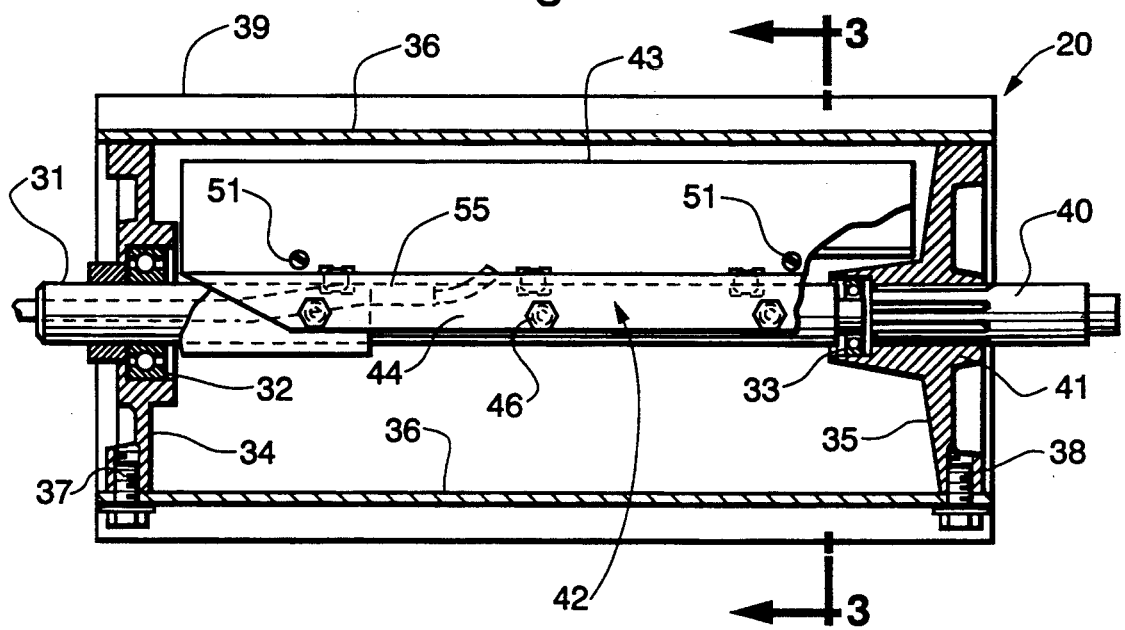
FIG. 2 is a part sectional view taken along the line 2—2 of FIG. 1 and illustrating the mounting of a metal detector inside a feed roll.

Lower front feed roll 20, shown in detail in FIG. 2, includes a stationary shaft 31 on which the feed roll is journaled for rotation in bearing assemblies 32, 33 suitably mounted in feed roll end caps 34, 35. A generally tubular nonferrous outer wall 36 of the feed roll is secured to end caps 34, 35 by fastening means 37, 38. A series of radial aggressive nonferrous flange elements 39 are provided for engaging and feeding the mat of crop material in the usual manner.

A splined stub drive shaft 40 is contained by a collar 41 forming an integral part of end cap 35. When drive shaft 40 is rotated by a feed drive mechanism (not shown) of the forage harvester, the drive force rotates feed roll end caps 34, 35 and the tubular outer wall 36 of the feed roll. Bearings 32, 33 permit rotation of the end caps even through the shaft 31 remains stationary. In this regard, the left end of shaft 31, as viewed in FIG. 2, may be keyed to a support block affixed to the frame of the forage harvester as shown in Chow et al. Pat. No. 4,353,199.

Figure 3:
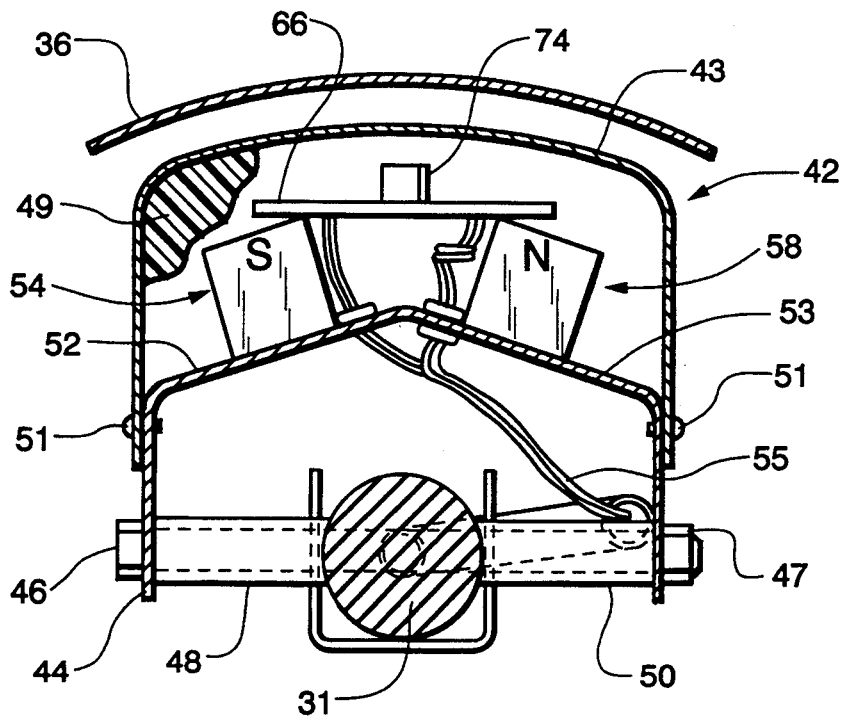
FIG. 3 is a sectional view taken along the line 3—3 of FIG. 2 and illustrating the mounting of a metal detector and a circuit board inside of a feed roll.
Figure 4:
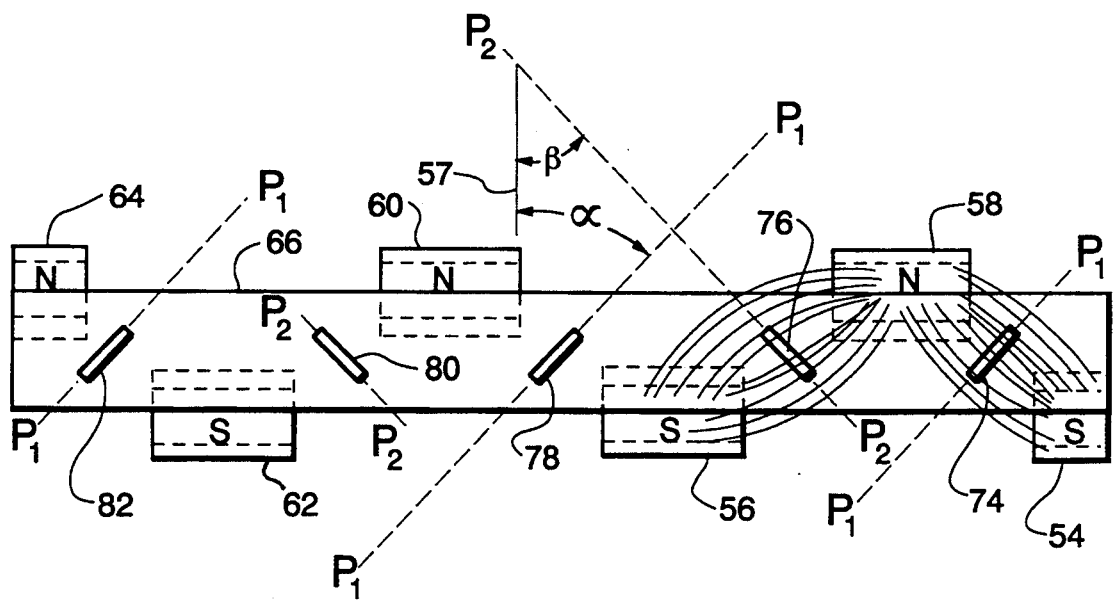
FIG. 4 is a schematic plan view of a circuit board surmounting a plurality of permanent magnets, the view also illustrating magnetic lines of flux produced between sets of the magnets.

Referring to FIGS. 3 and 4, a metal detector assembly 42 is mounted on the stationary shaft 31 as described in U.S. Pat. No. 4,433,528 to Bohman. The detector assembly 42 includes a cover plate 43, preferably made of aluminum or another non-ferrous material, and a ferrous steel mounting frame 44 which serve to support and cover a plurality of magnets 54, 56, 58, 60, 62 and 64 and a printed circuit board 66. Mounting frame 44 is secured to fixed shaft 31 by a series of bolts 46 and nuts 47 spaced by spacers 48, 50 disposed between the inner surface of frame 44 and shaft 31. Cover plate 43 is secured to, and aligned with, the outer surface of mounting frame 44 by a series of metal screws 51. The printed circuit board 66 carries a plurality of Hall effect transducers 74, 76, 78, 80 and 82 and circuitry for the processing of signals generated by the metal detector.

The magnets 54, 56, 58, 60, 62 and 64 are mounted on the surfaces 52 and 53 of mounting frame 44. The printed circuit board 66 surmounts the magnets. Cover plate 43 and mounting frame 44 form an enclosed region which is filled with an encapsulating material 49 such as an epoxy or urethane. For the sake of clarity, only a portion of the encapsulating material is shown in FIG. 3. A cable 55 extends from the printed circuit board 66 through an axial opening in stationary shaft 31. The cable 55 includes leads for supplying voltages to the circuits on board 66 and leads for conveying output signals from the circuits on the board to circuits external to the feed roll.

Figure 5:
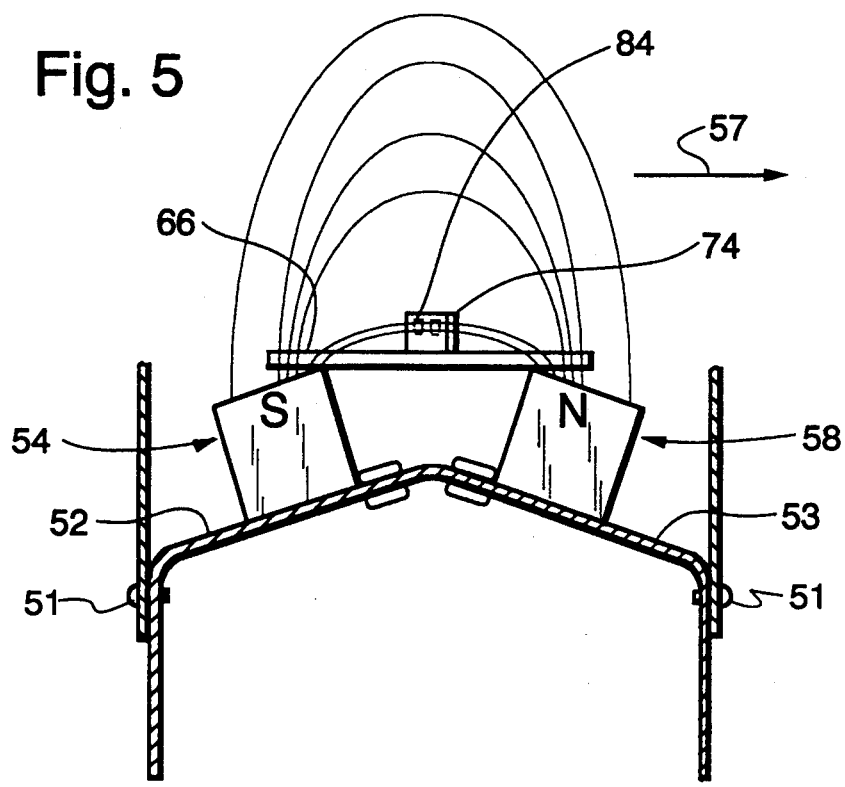
FIG. 5 is a diagrammatic elevation view illustrating the relationship between the detection field generated by the metal detector and the crop feed path; and, FIG. 6 is a perspective view of a transducer module, the view including a block diagram of a signal processing circuit for processing the output signal from the module.

FIG. 4 is a top view showing the arrangement of magnets 54, 56, 58, 60, 62 and 64 and the transducers 74, 76, 78, 80 and 82. The magnets may be electromagnets or permanent magnets, permanent magnets being shown to avoid the necessity of showing energizing windings. The number of magnets may vary depending on the application. The magnets are arranged in two rows extending transverse to the crop feed path represented by arrow 57 (FIG. 4) the magnets of one row having a North pole adjacent board 66 and the magnets of the second row having a South pole adjacent the board as best seen in FIG. 5.

Figure 6:
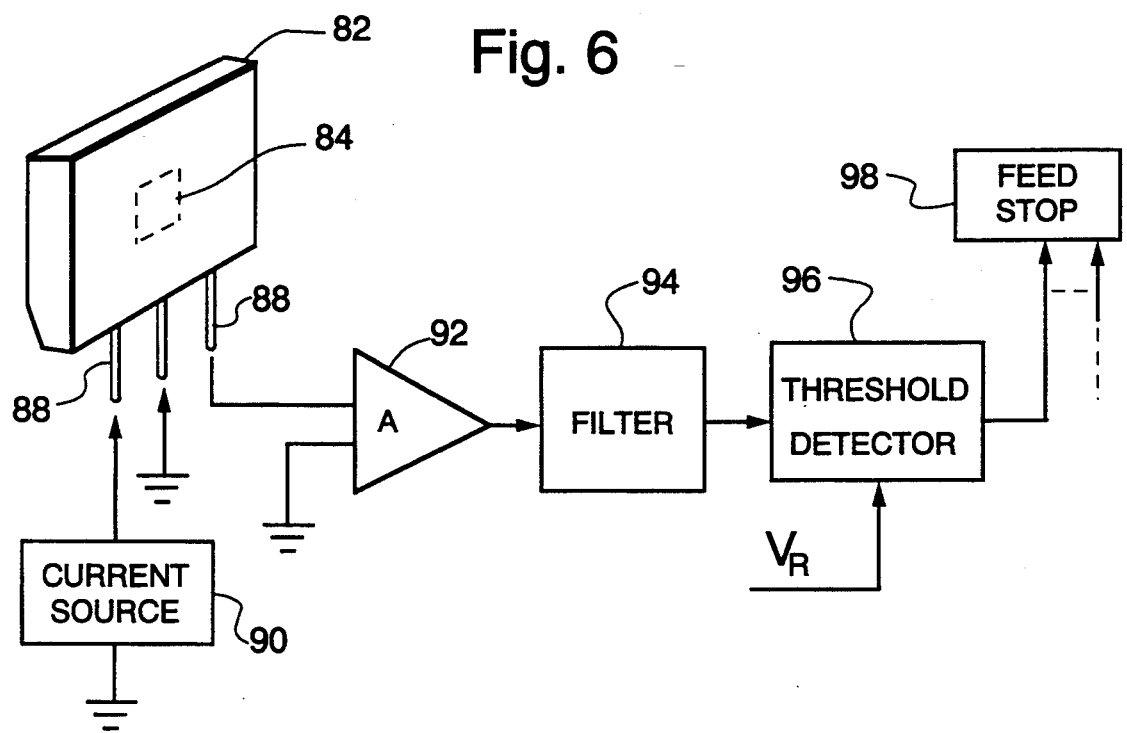

The transducers may be pluggable modules such as the model 3503 ratiometric, linear Hall effect sensor sold commercially by Allegro Microsystems, Inc. These pluggable units includes a Hall sensing element, linear amplifier and an emitter-follower output stage. FIG. 6 includes a perspective view of a module 82 having a sensing element 84 which is a planar conductive film. According to Hall effect theory, when sensing element 84 is placed in a magnetic field perpendicular to its plane, and a direct current is caused to flow through the sensing element from one side to the opposite side, an electric field is produced in the plane of the sensing element in a direction perpendicular to current flow, the intensity of the electric field being proportional to the magnetic field density.

The placement of the magnets is such that flux lines are established between a magnet in one row and the two magnets closest thereto in the second row. This is illustrated in FIG. 4 where flux lines are shown extending from the magnet 58 to the magnets 54 and 56. FIG. 5 is a schematic elevation of magnets 54 and 58 and shows that the flux lines between these magnets extend outwardly into the crop feed path represented by arrow 57.

Each transducer is disposed such that its sensing element intercepts flux lines extending between the magnets of a set, that is, between the North pole of a magnet in one row and the South pole of a magnet in the other row. Each sensing element is positioned in a plane perpendicular to the flux lines passing through it, or as nearly perpendicular as possible. In the event the sensing elements become saturated, it would then become necessary to offset the angle of the plane in which the elements are positioned. Assuming that the magnets in a given row are equally spaced this results in the sensing elements of alternate transducers 74, 78, and 82 being disposed in parallel planes P1 which are at a substantial angle $\alpha$ on the order of 45 degrees relative to the direction of crop feed with the remaining transducers 76 and 80 being disposed in generally parallel planes P2 which are at a substantial angle $\beta$ on the order of 45 degrees relative to the direction of crop feed. While equal spacing between the magnets of a set is preferred, it is not essential and in the case of non-uniform spacing the planes P1 or planes P2 may not be parallel.

The transducers, in addition to being positioned so that their sensing elements 84 are at an angle with respect to the direction of crop feed as shown in FIG. 4, are oriented such that the planes of the sensing elements are normal to the crop feed path as shown in FIG. 5.

When the magnets and the transducers are disposed as described above, the magnets create a magnetic detection field extending into and across the crop feed path, the detection field comprising a plurality of magnetic fields with each field extending between a set of magnets which includes a magnet in each row. Each field of the plurality of fields has flux lines extending through a transducer in a direction generally normal to the plane of the Hall sensing element therein. Thus, when a ferrous metal object being fed along the crop feed path passes through one or more of the plurality of magnetic fields, the flux density through one or more of the sensing elements is varied and it or they produce output signals.

In FIG. 6, a typical transducer module 82 has three pins which are inserted into board 66. One pin is connected to ground and a second pin is connected to a current source 90 which causes direct current flow through the sensing element 84 in the transducer. The third pin or signal output pin is connected to an amplifier 92 in a signal processing channel which also includes a low-pass filter circuit 94 and a threshold detector 96.

After the output signal from transducer 82 is amplified by amplifier 92 it is applied to the filter circuit 94 which is designed to filter from the transducer output signal the higher frequency noise caused by movement of ferrous machine parts such as gear teeth near the region of the detection field. The filtered signal is then applied to a threshold detector which compares the filtered signal with a reference voltage $V_R$. The threshold detector is set so that noise generated by moving machine parts will not cause the detector to produce an output signal.

When tramp metal passes through the magnetic field in which sensing element 84 is disposed, it varies the magnetic field so that the sensing element produces an output signal. After amplification by amplifier 92 and filtering by filter circuit 94, the output signal triggers threshold detector 96 and the detector produces an output signal to energize a feed stop mechanism 98. The feed stop mechanism is conventional and may, for example, be of the type disclosed in Bohman et al. Pat. No. 5,078,645.

Although FIG. 6 shows only one signal processing channel, it will be understood that a signal processing channel is provided for each of the transducers 74, 76, 80, 82 and 84, the channels all having outputs connected to the feed stop mechanism 98.

From the foregoing description it is seen that the present invention provides a metal detector which requires less space than prior art detectors used to detect tramp metal in the crop feed path of an agricultural harvester. Since the magnets may be mounted underneath the printed circuit board and no space is required above the board for bulky sensing coils, the printed circuit board may be raised considerably, limited only by the circuitry and transducers mounted thereon. Thus, even though the magnets are mounted below the circuit board, they may in effect be located closer to the internal periphery of the feed roll so that their detection fields may extend further into and across the crop feed path.

It is not essential that the magnets be located below the circuit board. They may be located on the top surface of the circuit board or even on a separate support. However, mounting of the magnets below the board has an advantage in that the board may then provide the support for the transducer elements.

Furthermore, the magnets and transducer elements need not be mounted within a feed roll although this location has the advantage of protecting the detecting apparatus while permitting the disposition of the magnets closely adjacent the crop feed path. However, the present invention is suitable for use in other positions such as under a floor plate adjacent the crop feed path as suggested in U.S. Pat. No. 4,344,074.

Still further, an advantage of the present invention is that, unlike coils, Hall effect devices can be placed at specific locations to maximize signal-to-noise ratio. Yet another advantage is that Hall effect devices do not require speed compensation, as do coils.

Although a specific preferred embodiment has been described in detail to illustrate the principles of the invention, it will be understood that various modifications and substitutions may be made in the described embodiment without departing from the spirit and scope of the invention as defined by the appended claims.

We claim:

1. Apparatus for detecting the passage of ferrous metal objects through the crop feed path of an agricultural harvester, said harvester having feed means for feeding crop material along said crop feed path in a crop feed direction, said apparatus comprising:
   a plurality of magnets disposed in a first row and a second row adjacent said crop feed path and extending across said crop feed path transverse to said crop feed direction, magnets of said first row having South poles generally facing said crop feed path and magnets of said second row having North poles generally facing said crop feed path whereby magnetic fields produced by the magnets are traversed by crop material and any ferrous metal objects therein being fed along the crop feed path, said ferrous metal objects causing variations in at least one of said magnetic fields;

a plurality of generally planar Hall sensing elements, each element being spaced from and disposed between a pair of magnets comprising a magnet in said first row and a magnet in said second row such that a magnetic field produced by a given pair of magnets extends through the Hall sensing element disposed between said given pair of magnets in a direction normal to the plane of the Hall sensing element;

means for causing a direct current to flow through the Hall sensing elements whereby a given Hall sensing element produces an output signal when a ferrous metal object passes through the magnetic field in whch the given Hall sensing element is disposed; and, means responsive to an output signal from any said Hall sensing elements for stopping said crop feed means when passage of a ferrous metal object through at least one of said magnetic fields is detected.

2. Apparatus as claimed in claim 1 wherein said feed means comprises at least one feed roll, said magnets and said Hall sensing elements being disposed within said at least one feed roll.

3. Apparatus as claimed in claim 2 and further comprising a circuit board supported inside said at least one feed roll, said Hall sensing elements being mounted on said circuit board.

4. Apparatus as claimed in claim 3 wherein said means for stopping said crop feed means includes signal processing circuits on said circuit board.

5. Apparatus for detecting the passage of ferrous metal objects through the crop feed path of an agricultural harvester, said harvester having feed means for feeding crop material in a crop feed direction along said crop feed path, said apparatus comprising:

a first group of magnets having South poles facing generally toward said crop feed path;

a second group of magnets having North poles facing generally toward said crop feed path;

said first and second groups of magnets being disposed transverse to the crop feed path and arranged such that except for end magnets of a row magnetic lines of flux extend between each magnet of said first group and two magnets of said second group, at least some of said magnetic lines of flux comprising a detection field through which said crop feed path extends;

a plurality of planar Hall sensing elements disposed in a plurality of planes perpendicular to said crop feed path and at substantial different angles relative to the direction of crop feed, each of said Hall sensing elements being disposed such that magnetic lines of flux between a magnet of said first group and a magnet of said second group passes through the Hall sensing element generally perpendicular to the plane of the Hall sensing element;

means for applying a direct current to said Hall sensing elements; and, means connected to said Hall sensing elements for stopping the feed means when a ferrous metal object passes through said detection field.

6. Apparatus as claimed in claim 5 wherein said feed means comprises at least one feed roll, said magnets and said Hall sensing elements being disposed within said at least one feed roll.

7. Apparatus as claimed in claim 5 wherein said magnets are permanent magnets.

8. Apparatus for detecting the passage of ferrous metal objects through the crop feed path of an agricultural harvester, said harvester having feed means for feeding crop material along said crop feed path, said apparatus comprising:

a first group of magnets having South poles facing generally toward said crop feed path;

a second group of magnets having North poles facing generally toward said crop feed path;

said first and second groups of magnets being disposed transverse to the crop feed path and arranged such that magnetic lines of flux extend between each magnet of said first group and at least one magnet of said second group, at least some of said magnetic lines of flux comprising a detection field through which said crop feed path extends;

a plurality of planar Hall sensing elements disposed in a plurality of planes perpendicular to said crop feed path and at substantial angles relative to the direction of crop feed, each of said Hall sensing elements being disposed such that magnetic lines of flux between a magnet of said first group and a magnet of said second group passes through the Hall sensing element generally perpendicular to the plane of the Hall sensing element;

means for applying a direct current to said Hall sensing elements;

means connected to said Hall sensing elements for stopping the feed means when a ferrous metal object passes through said detection field, said feed means comprising at least one feed roll, said magnets and said Hall sensing elements being disposed within said at least one feed roll; and, a circuit board supported inside said at least one feed roll, said Hall sensing elements being mounted on said circuit board.

9. Apparatus as claimed in claim 8 wherein said magnets and said circuit board are supported within an enclosed housing within said at least one feed roll.

10. Apparatus as claimed in claim 9 wherein said enclosed housing is filled with an encapsulating material.

11. Apparatus as claimed in claim 8 wherein said magnets are surmounted by said circuit board.

12. Apparatus as claimed in claim 8 and further comprising means for encapsulating said magnets and said circuit board.

* * * * *